United States Patent
Asakura

(10) Patent No.: US 6,202,583 B1
(45) Date of Patent: Mar. 20, 2001

(54) STEERING STRUCTURE OF PERSONAL WATERCRAFT

(75) Inventor: Yukio Asakura, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 09/409,214

(22) Filed: Sep. 30, 1999

(30) Foreign Application Priority Data

Oct. 8, 1998 (JP) .................................................. 10-286114

(51) Int. Cl.[7] ................................................... B63H 25/00
(52) U.S. Cl. ...................... 114/144 R; 114/55.5; 114/169; 74/543; 74/551.1
(58) Field of Search ............................... 114/144 R, 154, 114/169, 55.5, 55.55, 55.57; 74/543, 552, 551.1, 551.2, 551.3; 440/40, 41, 42, 62, 63; 411/119, 120, 121, 197, 204

(56) References Cited

U.S. PATENT DOCUMENTS

| | | | |
|---|---|---|---|
| 382,200 | * 5/1888 | Ware | 411/120 |
| 1,351,974 | * 9/1920 | Stubblefield | 411/197 |
| 2,303,049 | * 11/1942 | Ingalls | 74/552 |
| 2,468,659 | * 4/1949 | Garnier | 74/551.3 |
| 2,827,340 | * 3/1958 | Johnson | 308/72 |
| 3,394,673 | * 7/1968 | Hamori | 114/55.55 |
| 3,434,452 | * 3/1969 | Crow | 114/55.55 |
| 3,570,444 | * 3/1971 | Farr | 114/55.55 |
| 3,627,389 | * 12/1971 | Foote, Jr. | 308/72 |
| 4,141,309 | * 2/1979 | Halboth | 115/70 |
| 4,227,826 | * 10/1980 | Conrad | 403/371 |
| 4,767,901 | * 8/1988 | Goyarts | 200/306 |
| 4,842,424 | * 6/1989 | Narkon et al. | 384/203 |
| 4,986,208 | * 1/1991 | Kobayashi | 114/270 |
| 5,054,798 | * 10/1991 | Zulawski | 280/16 |
| 5,355,826 | * 10/1994 | Hattori et al. | 114/270 |
| 5,377,557 | * 1/1995 | Nastrucci | 74/551.2 |
| 5,674,034 | * 10/1997 | Bennett | 411/197 |
| 6,062,154 | * 5/2000 | Ito | 114/55.57 |

FOREIGN PATENT DOCUMENTS

| | | |
|---|---|---|
| 61-181797 | 8/1986 | (JP) . |
| 61-229690 | 10/1986 | (JP) . |
| 2-105099 | 8/1990 | (JP) . |
| 3000973 | 6/1994 | (JP) . |
| 7-21438 | 5/1995 | (JP) . |

\* cited by examiner

Primary Examiner—S. Joseph Morano
Assistant Examiner—Ajay Vasudeva
(74) Attorney, Agent, or Firm—Marshall, O'Toole, Gerstein, Murray & Borun

(57) ABSTRACT

A steering structure of a personal watercraft comprising, a mount member 3 provided on a mount base 2 on an upper portion of a deck 1, a hold member 8 provided inside of the deck separated downward from the mount members 3 by a predetermined distance, a handle support shaft 4 supported by the hold member 8 and the mount member 3, and a support collar 11 provided at the handle support shaft 4, for rotatably supporting the handle support shaft 4, and for absorbing a deviation of support positions of the handle support shaft 4.

9 Claims, 7 Drawing Sheets

STEERING STRUCTURE OF PERSONAL WATERCRAFT

BACKGROUND OF THE INVENTION

The present invention relates to a steering structure of a personal watercraft running on water.

A personal watercraft running on water is used mainly for leisure or for sports. A driver sits on a seat provided on a rear portion of a deck of the watercraft, and operates the watercraft by gripping a handle disposed in front of the seat.

The personal watercraft is propelled by a propelling device mounted on a rear portion of a body thereof, and is driven by an engine mounted in an engine room within the body, and propelling direction is changed by turning the handle.

FIG. 7 shows a handle supporting apparatus in a conventional personal watercraft disclosed in Japanese Patent Laid-open No. 61-229690. In this apparatus, a steering column 52 is mounted to a mount wall 51 on a deck, a steering shaft 53 is rotatably supported in the steering column 52, and a tilting member 54 for adjusting its forward and backward angle is supported by the steering shaft 53. The angle of the tilting member 54 in forward and backward direction can be adjusted by a positioning means 55 provided between the tilting member 54 and the steering shaft 53.

Referring to other references, Japanese Utility Model Application Laid-open No. Hei 2-105099 discloses a handle bar of a folding type, and Japanese Utility Model Publication No. Hei 7-21438 discloses a handle post cover whose junctures can be precisely alienable.

However, the handle supporting apparatus described above is formed by combining a large number of parts required to be manufactured with a high degree of precision, which increases product cost.

A large number of parts requires long time for assembling work of the steering structure, and the number of parts also increases the weight of the steering structure.

The other references described above also include similar problems in connection with the number of parts requiring high degree of precision and number of steps for assembling the steering structure.

SUMMARY OF THE INVENTION

In order to solve the above-mentioned problems, the present invention provides a steering structure of a personal watercraft comprising: a mount member provided on a mount base formed on an upper portion of a deck of the watercraft; a hold member provided inside of the deck separated downward from the mount member by a predetermined distance; a handle support shaft supported by the hold member and the mount member; and a support collar provided at support portion of the handle support shaft, for rotatably supporting the handle support shaft, and for absorbing a deviation of support positions of the handle support shaft.

Because the handle support shaft is supported by the mount member provided on the upper portion of the deck and by the hold member separated downward from the mount member by a predetermined distance, the number of parts required for the steering structure can be reduced, and the structure can be assembled quickly. The support collar which absorbs deviation of support positions of the handle support shaft, i.e., off center of the mount member and the hold member, further reduce the number of parts requiring high degree of precision, thus reducing product cost.

Further, the weight of the product can also be reduced by a small number of parts.

By forming a contact surface of the support collar which contacts with the support position of the mount member into a spherical surface, deviation of support positions of the handle support shaft can be absorbed by inclination of the support collar along the spherical surface.

By the hold member connecting side walls at the position separated downward from the upper portion of the deck by a predetermined distance, the force of the steering operation can be transmitted to the side wall of the deck through the hold member.

By providing an operation lever for changing a propelling direction on the handle support shaft between the mount member and the hold member, the operating force of the operation lever can be supported at both upper and lower portion of the handle support shaft.

The present invention also provides a steering structure of a personal watercraft comprising: a mount member provided on a mount base formed on an upper portion of a deck of the watercraft; a handle support shaft supported by the mount member, the shaft having a threaded portion and a non-circular portion formed beneath the threaded portion; a nut screwed on the threaded portion of the handle support shaft for stopping axial movement of the shaft, the nut having gripping projections formed on a peripheral surface in axial direction, and the nut having threaded holes on a lower end surface; and a rotation stop element secured to the lower end surface of the nut, the element having a non-circular through hole at the center to be fitted over the non-circular portion of the handle support shaft, and having a plurality of rotation stop holes arranged on the same pitch circle as the threaded holes formed on the lower end surface of the nut.

With this structure, rotation of the nut for securing the handle support shaft on the mount member is stopped with the rotation stop element having a plurality of rotation stop holes. Consequently, screwing amount of the nut can be adjusted minutely with small rotation angle, therefore, assembling and adjusting work of the handle support shaft to the mount members can be performed more easily and precisely.

These object as well as other objects, features and advantages of the present invention will become more apparent to those skilled in the art from the following description with reference to the accompanying drawings.

DESCRIPTION OF THE PREFERRED EMBODIMENTS

Figure 1:
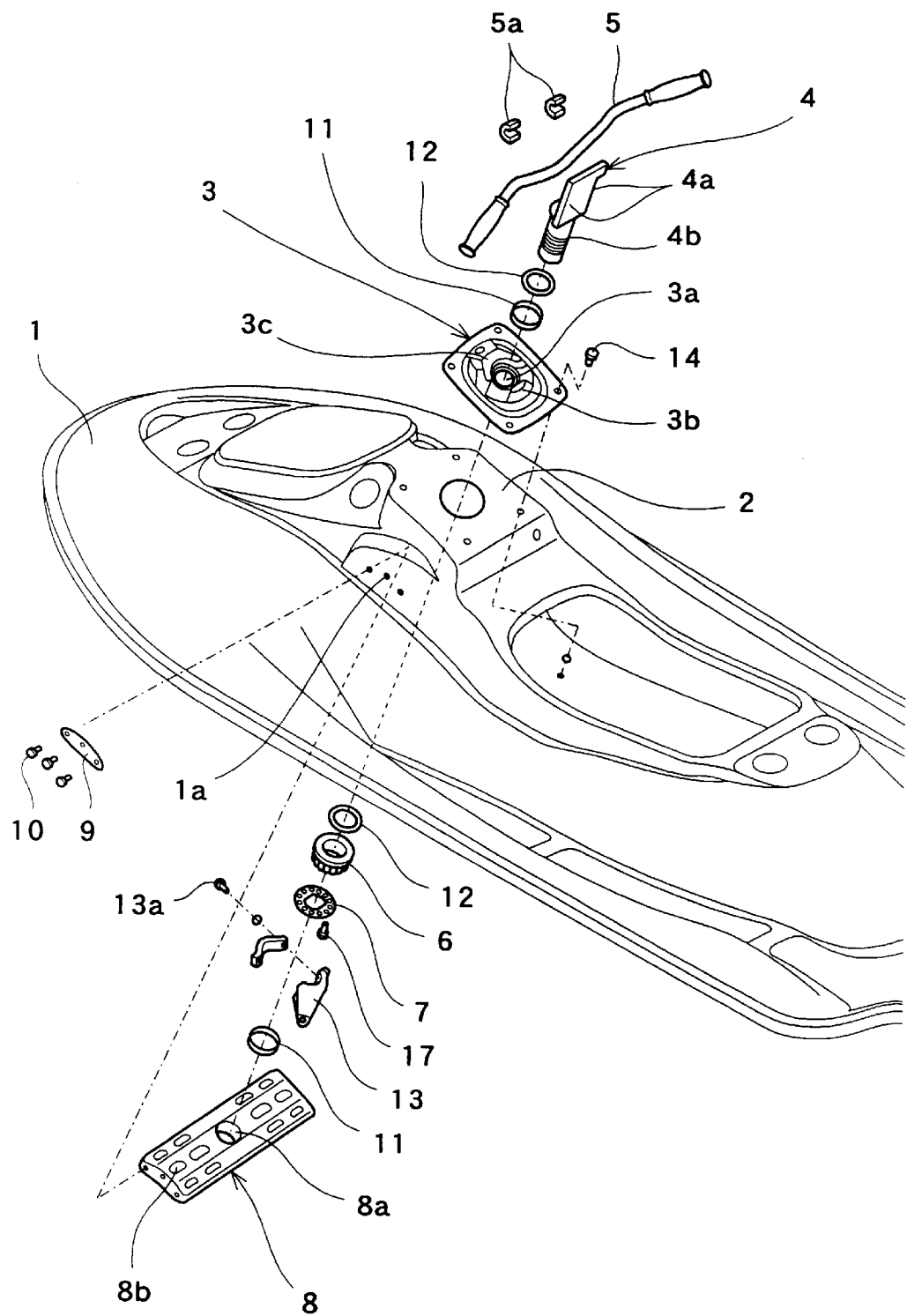
FIG. 1 is an exploded perspective view of a steering structure according to an embodiment of the present invention.
Figure 2:
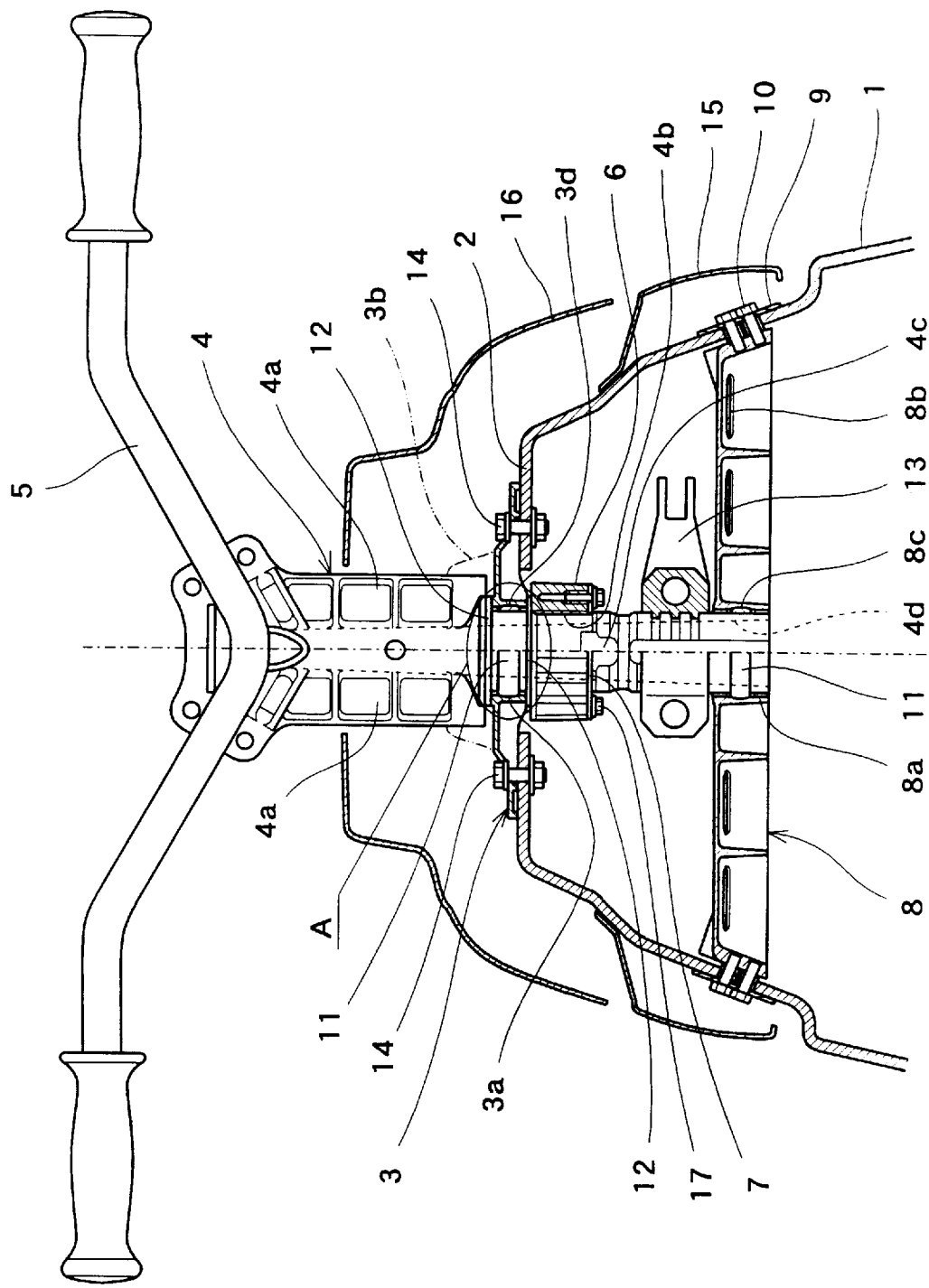
FIG. 2 is a vertical sectional view of the steering structure shown in FIG. 1.

FIG. 1 shows an exploded perspective view of a steering structure according to an embodiment of the present invention, and FIG. 2 shows a vertical sectional view of the steering structure.

As shown in FIG. 1 and 2, a mounting base 2 for a steering structure is formed on an upper portion of a deck 1, on which a mount member 3 is provided. The mount member 3 is a plate-like member having an insertion hole 3a formed in a central portion through which a handle support shaft 4 is inserted from above. The handle support shaft 4 is of a hollow structure having a space 4d (see FIG. 2) to pass wires of switches on a handle 5 therethrough into the deck 1. The handle 5 is attached to the handle support shaft 4 by fixing members 5a.

The mount member 3 has a rear wall 3b and a front wall 3c formed on the upper surface. The handle support shaft 4 has handle stoppers 4a projected on both sides which abut walls 3b and 3c on the mount member 3. The steering (rotating) angle of the handle support shaft 4 is limited between abutting positions of the handle stoppers 4a and walls 3b and 3c on the mount member 3.

A nut 6 for stopping axial-movement of the handle support shaft 4 to be screwed on a threaded portion 4b provided on the handle support shaft 4, and a rotation stop element 7 for restricting rotation of the nut 6 are provided inside the deck 1. By screwing the nut 6 on to the threaded portion 4b of the handle support shaft 4 for rotatably securing the shaft 4 on the mount member 3, and then fixing the element 7 to the nut 6 with bolts 17, the handle support shaft 4 is secured to the mount member 3.

A hold member 8 is provided inside the deck 1 at a position separated downward from the mount member 3 by a predetermined distance, and the hold member 8 is secured to the side walls of the deck 1 by bolts 10 together with plates 9 from outside of mount holes 1a formed in both left and right side walls of the deck 1. The side walls of the deck 1 are connected to each other by the hold member 8 at the position separated downward from the upper portion of the deck 1 by a predetermined distance (see FIG. 2). The hold member 8 is provided at its central portion with an insertion hole 8a to receive the lower end of the handle support shaft 4 passed through the insertion hole 3a. The weight of the hold member 8 is reduced by forming a plurality of cutouts 8b.

The handle support shaft 4 is supported by the hold member 8 and the mount member 3 is provided on the deck upper portion. A split type operation lever 13 which transmits rotation of the handle support shaft 4 for changing the propelling direction of the watercraft is secured to the handle support shaft 4 by a bolt 13a between the mount member 3 and the hold member 8. Thus the operation lever 13 is stably held on the handle support shaft 4 between its upper and lower support portions.

In the assembled state of the steering structure, as shown in FIG. 2, the mount member 3 is secured to the mount base 2 of the deck 1 by bolts 14, and the handle support shaft 4 is inserted from above into the insertion hole 3a formed in the central portion of the mount member 3. Support collars 11 are disposed in the respective insertion holes 3a and 8a of the mount member 3 and the hold member 8.

Washers 12 are disposed on the upper side and he lower side of the insertion hole 3a of the mount ember 3. The upper washer 12 is disposed between the handle support shaft 4 and the mount member 3, and the lower washer 12 is disposed between the nut 6 and the count member 3.

The nut 6 for stopping axial movement of the handle support shaft 4 is screwed on to the threaded portion 4b of the handle support shaft 4 inserted through the insertion hole 3a of the mount member 3 mounted on the base 2 of the deck 1, and the rotation stop element 7 for restricting the rotation of nut 6 is secured to the nut 6 with bolts 17. Thereby, the handle support shaft 4 is rotatably supported to the mount member 3 preventing the escape of the shaft 4 in the axial direction.

Figure 3:
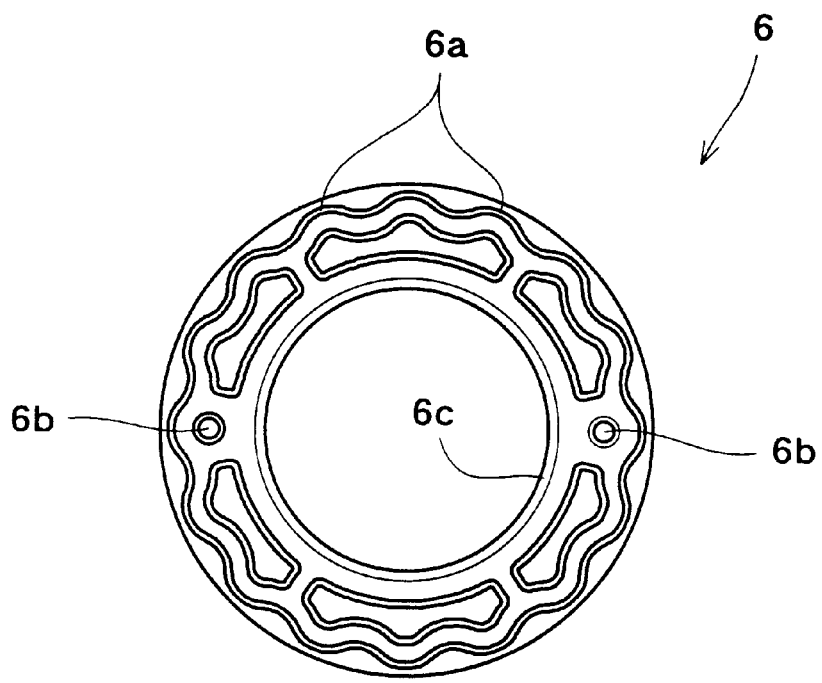
FIG. 3(a) is a plan view of a nut for stopping axial movement in the steering structure shown in FIG. 1.
FIG. 3(b) is a partly sectioned side view of the nut shown in FIG. 3(a)
Figure 3:
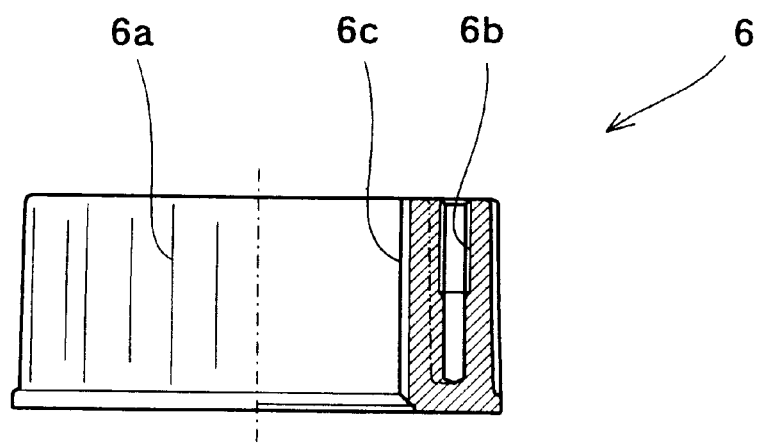

FIGS. 3(a) and (b) show a plan view and a partly sectional side view of the nut 6 for stopping axial movement of the handle support shaft 4. The nut 6 (FIG. 2) has an internal thread 6c formed at its central portion to be screwed on the threaded portion 4b of the handle support shaft 4, and has corrugated gripping projections 6a formed on its periphery. Two rotation stop holes 6b (screw holes) for stopping rotation of the nut 6 are formed on the lower end surface of the nut 6 at two opposed positions in the gripping projections 6a.

Figure 4:
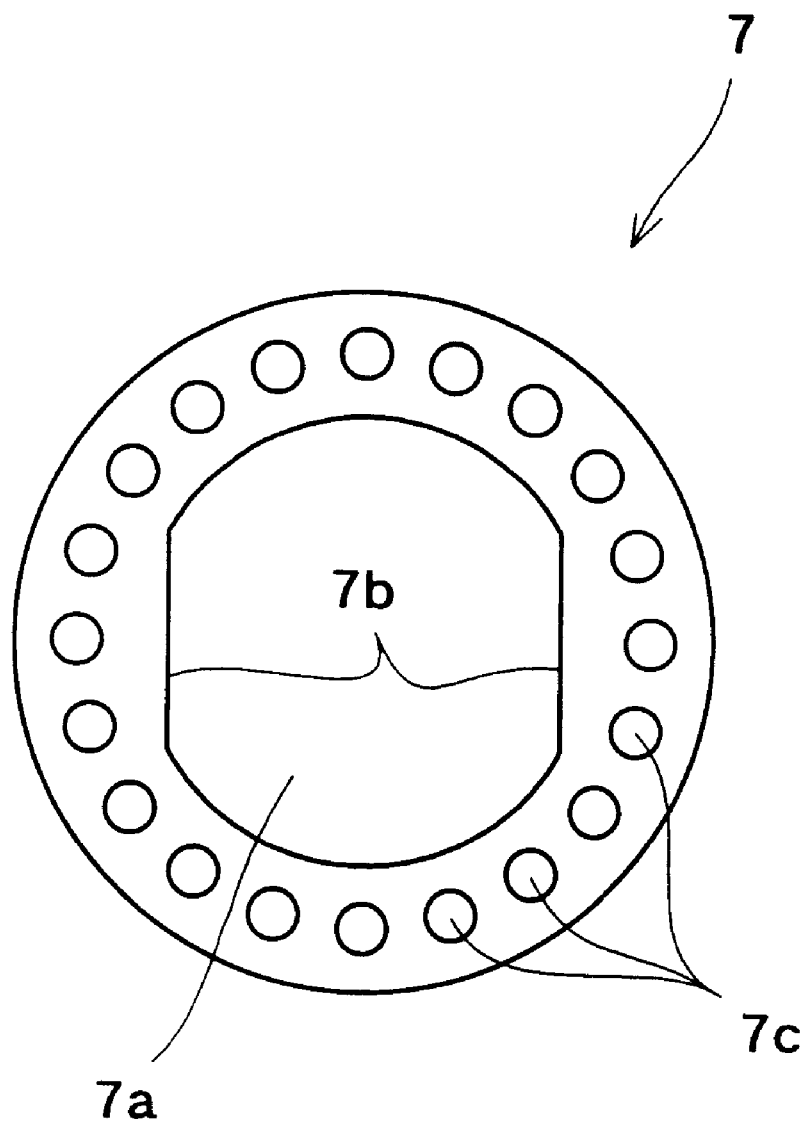
FIG. 4 is a plan view of a rotation stop element in the steering structure shown in FIG. 1.

FIG. 4 shows a plan view of the rotation stop element 7. The element 7 is a plate element of predetermined thickness. A parallel portion 7b corresponding to a parallel surface 4c (FIG. 2) on the handle support shaft 4 is formed in the through hole 7a formed at central portion. A plurality of holes 7c are formed around the parallel portion 7b of the through hole 7a on the same pitch circle as that of the holes 6b (FIG. 3) provided on the lower end surface of the nut 6. By providing the large number of holes 7c in this manner, the screwing amount of the nut 6 can be adjusted minutely with a small rotation angle.

Therefore, as shown in FIG. 2, when the nut 6 is screwed on to the threaded portion 4b of the handle support shaft 4 and the rotation stop element 7 is secured on to the nut 6 with its parallel portion 7b of the through hole 7a is fitted to the parallel surface 4c of the handle support shaft 4, thus, the handle support shaft 4 is rotatably supported with its axial movement being restricted.

Figure 5:
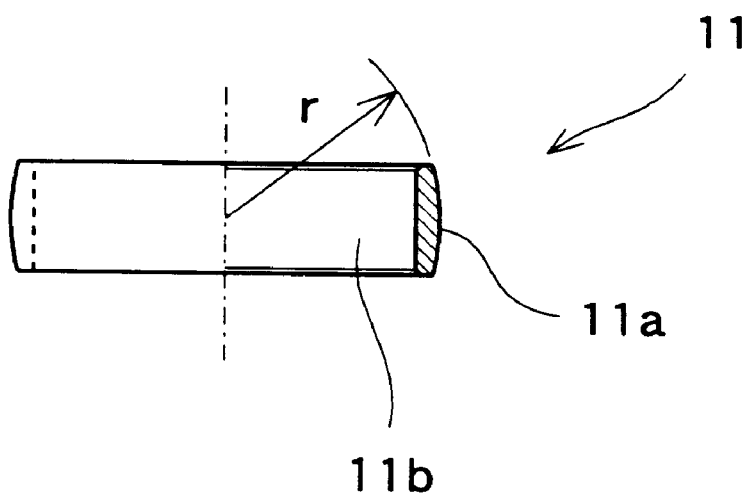
FIG. 5(a) is a partly sectioned side view of a support collar in the steering structure shown in FIG. 1.
FIG. 5(b) is a plan view of the support collar shown in FIG. 5(a)
Figure 5:
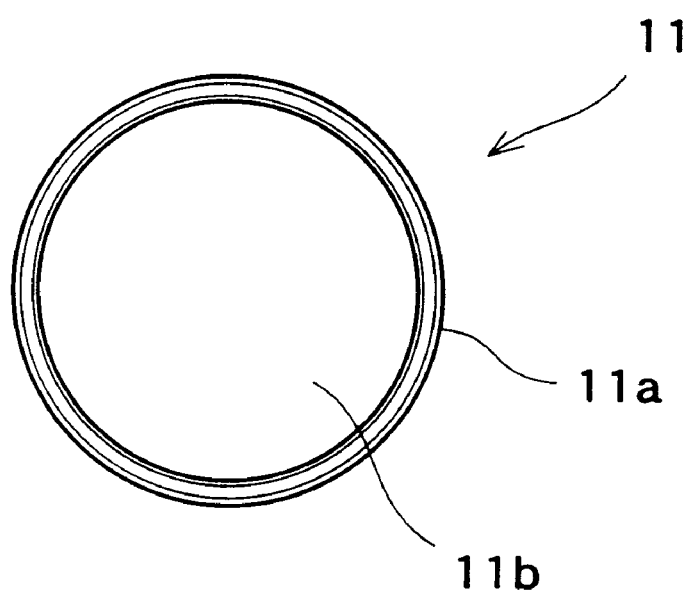
Figure 6:
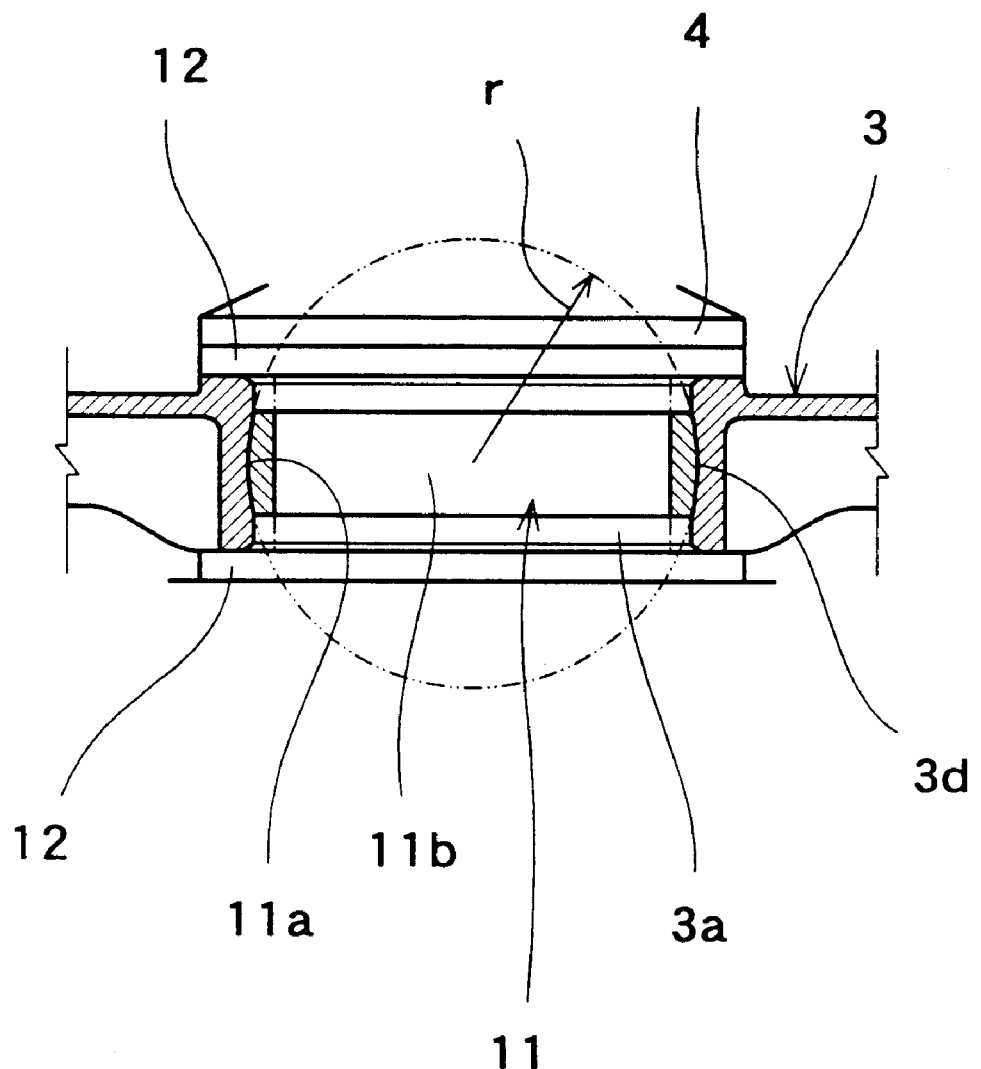
FIG. 6 is an enlarged view of a portion "A" in FIG. 2.
Figure 7:
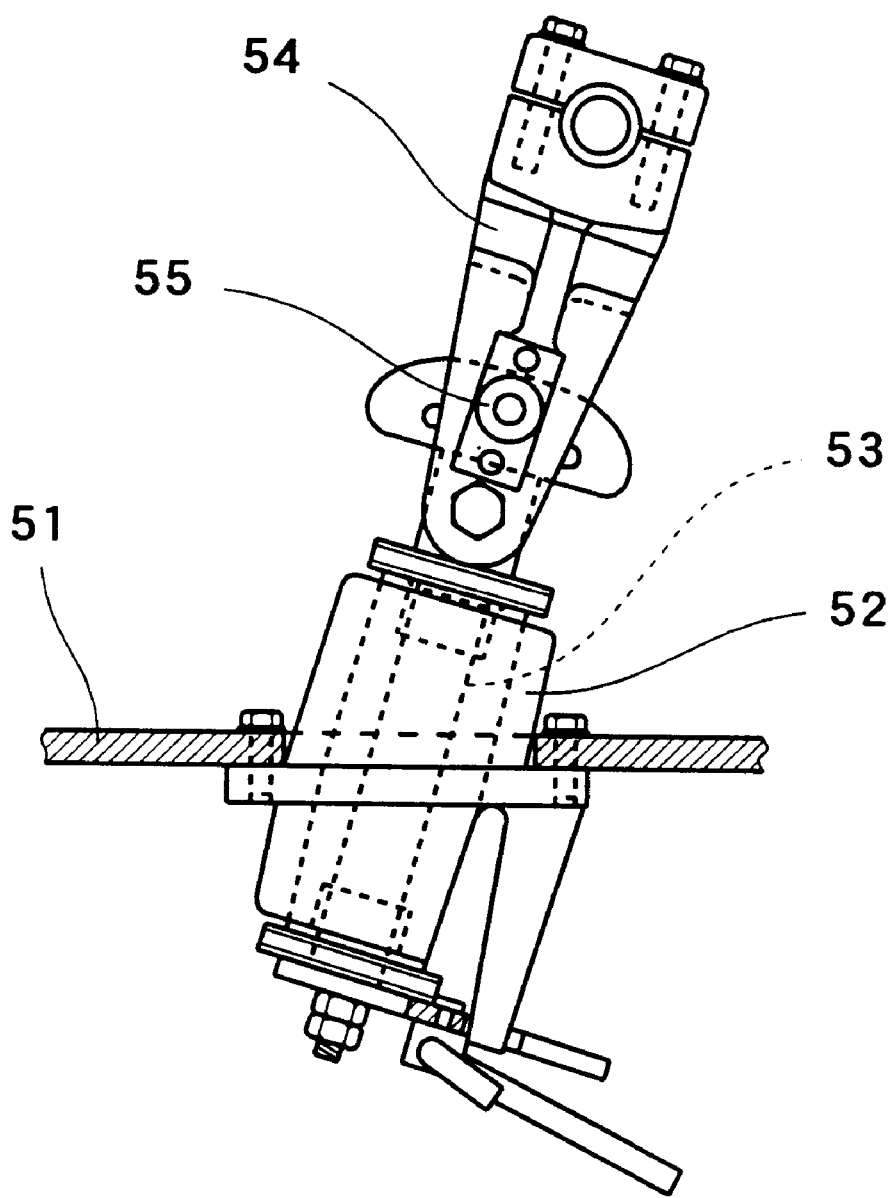
FIG. 7 is a side view prior art showing a handle support structure in a conventional personal watercraft.

FIGS. 5(a) and 5(b) show a partly sectioned side view and a plan view of the supporting collar 11. An outer surface 11a of the support collar 11 is formed in a spherical shape having a predetermined radius r, and an inner surface 11b thereof is formed into a cylindrical shape corresponding to the outer diameter of the handle support shaft 4. As shown in FIG. 6 of an enlarged view of a portion "A" in FIG. 2, the outer surfaces 11a of the support collar 11 formed in spherical shape, are mounted to fit along a spherical surface 3d of the predetermined radius formed in the inner surface of the insertion hole 3a of the mount member 3 and also to fit along a spherical surface 8c in the inner surface of the insertion hole of 8a of the hold member 8 (see FIG. 2). With the handle support shaft 4 supported in this manner by the support collar 11, as shown in FIG. 2, the outer surface 11a of the support collar 11 can be inclined along the spherical surface 3d of the mount member 3 and the spherical surface 8c of the hold member 8 to absorb the deviation of support positions of the handle supporting shaft 4 by the mount member 3 and the hold member 8. The support collar 11 may be of other shapes which support the handle support shaft 4 fitted to the inner cylindrical surface 11b thereof, and absorb the deviation of support positions of the shaft 4.

With this structure, a small amount of deviation of position or inclination of insertion holes 3a, 8a of the mount member 3 and the hold member 8, which may be caused by a misalignment or manufacturing error, can be absorbed by support collars 11 provided in the mount member 3 and the hold member 8 respectively.

Further, since the handle support shaft 4 is supported by the mount member 3 and the hold member 8 which are spaced apart at a predetermined distance, the deviation of support portions of the shaft 4 at insertion holes 3a and 8a can be absorbed more easily by a small inclination of respective support collars 11. Therefore, the steering structure can be assembled without being influenced by the deviation of support positions of the handle support shaft due to misalignment or manufacturing error of the mount member and the holding member, thus reducing the cost needed for manufacturing and assembling of the steering structure.

The reference number 15 and 16 denote covers provided to cover the upper portion of the deck 1. In this embodiment, the cover 15 is provided at opposite sides of the mount base 2, and the cover 16 is provided to cover the upper portion of the mount base 2.

By the above described steering structure, the assembly of the structure is substantially completed by inserting the handle support shaft 4 into the insertion hole 3a of the mount member 3 from above, and inserting the lower tip end of the handle support shaft 4 into the insertion hole 8a of the hold member 8, and then rotatably supporting the handle support shaft 4 by the nut 6 for stopping axial movement and the rotation stop element 7. Thus, the time needed for assembling work can be reduced.

In the above embodiment, the description has been made to the structure having the hold member 8 which connects the side walls of the deck. The hold member can also be provided between the front and rear walls of the deck, or between side wall and a rear wall of the deck depending upon the shape of the deck. As long as the hold member is provided at positions separated downward at a predetermined distance from the mounting base 2 provided at upper portion of the deck, the hold member is not limited to the member which connects the side walls of the deck.

In the above embodiment, a support collar 11 is provided both in the mount member 3 and the hold member 8, however, a support collar 11 may be provided only in either the mount member 3 or the hold member 8. The support collar 11 may be provided in accordance with the distance between members 3 and 8, or with respect to the diameter of the handle support shaft 4.

Numerous modifications and alternative embodiments of the present invention will be apparent to those skilled in the art in view of the foregoing description. Accordingly, this description is to be concerned as only illustrative, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. A steering structure of a personal watercraft comprising;
   a one-piece mount member provided on a mount base formed on an upper portion of a deck of the watercraft, said one-piece mount member having a spherical body with a central spherical aperture and including perimeter mounting means for mounting said mount member to said mount base;
   a one-piece hold member provided inside of the deck separated downward from said mount member by a predetermined distance said one-piece hold member including a central portion having an aperture;
   a handle support shaft insertable through the respective apertures of said one-piece mount member and said one-piece hold member and supported by said hold member and said mount member; and
   a one-piece support collar provided within said one-piece mount member at a support position of said handle support shaft, for rotatably supporting said handle support shaft, and, said one-piece support collar including a spherical outer circumference adapted to the central spherical aperture of said one-piece mount member so as to fit along a common spherical contact surface and a cylindrical inner aperture adapted to the support position of said handle support shaft for absorbing a deviation of support positions of said handle support shaft.

2. The steering structure of a personal watercraft according to claim 1, wherein said one-piece hold member central portion has a spherical aperture, and
   a second one-piece support collar mounted within said one-piece hold member at a second support position of said handle support shaft for rotatable supporting said handle support shaft, said second one-piece support collar including a spherical outer circumference adapted to the spherical aperture of said one-piece hold member so as to fit along a common spherical contact surface and a cylindrical inner aperture adapted to the second support position of said handle support shaft for absorbing a deviation of support positions of said handle support shaft.

3. The steering structure of a personal watercraft according to claim 1, wherein said hold member is provided to connect side walls of said deck at a location separated downward by a predetermined distance from the upper portion of said deck.

4. A steering structure of a personal watercraft comprising;
   a mount member provided on a mount base formed on an upper portion of a deck of the watercraft;
   a hold member provided inside of the deck separated downward from said mount member by a predetermined distance;
   a handle support shaft supported by said hold member and said mount member;
   a support collar provided at a support position of said handle support shaft, for rotatable supporting said handle support shaft, and for absorbing a deviation of support positions of said handle support shaft; and,
   an operation lever for changing a propelling direction secured on said handle support shaft at a location between said mount member and said hold member.

5. The steering structure of a personal watercraft according to claim 4, wherein a contact surface of said support collar which contacts with the mount member and the hold member is formed into a spherical surface.

6. The steering structure of a personal watercraft according to claim 4, wherein said hold member is provided to connect side walls of said deck at a location separated downward by a predetermined distance from the upper portion of said deck.

7. A steering structure of a personal watercraft comprising:
   a mount member provided on a mount base formed on an upper portion of a deck of the watercraft;
   a handle support shaft supported by said mount member, said shaft having a threaded portion and a non-circular portion formed beneath said threaded portion;

a nut screwed on to the threaded portion of said handle support shaft for stopping axial movement thereof, said nut having gripping projections formed on a peripheral surface in axial direction, and said nut having threaded holes on a lower end surface; and a rotation stop element secured to the lower end surface of said nut, said element having a non-circular through hole at its center to be fitted over the non-circular portion of the handle support shaft, and a plurality of rotation stop holes arranged on the same pitch circle as the threaded holes formed on the lower end surface of said nut.

8. A steering structure of a personal watercraft comprising:

a mount member provided on a mount base formed on an upper portion of a deck of the watercraft;

a handle support shaft supported by said mount member, said shaft having a threaded portion;

a nut provided beneath the mount member and screwed on to the threaded portion of said handle support shaft for stopping axial movement thereof;

restricting means for restricting the rotation of said nut, rotatably supporting the handle support shaft;

wherein said handle support shaft has a non-circular portion formed beneath said threaded portion, said restricting means includes said nut having threaded holes on a lower end surface, and a rotation stop element secured to the lower end surface of said nut, said element having a non-circular through hole at its center to be fitted over the non-circular portion of the handle support shaft, and a plurality of rotation stop holes arranged on the same pitch circle as the threaded holes formed on the lower end surface of said nut.

9. The steering structure of a personal watercraft according to claim 8, wherein said nut includes gripping projections formed on a peripheral surface in an axial direction.

* * * * *